United States Patent
Ebron (10) Patent No.: US 11,520,598 B2
(45) Date of Patent: Dec. 6, 2022

(54) MULTI-PROCESSOR MOBILE COMPUTING DEVICE

(71) Applicant: Anthony Donte Ebron, Nashua, NH (US)

(72) Inventor: Anthony Donte Ebron, Nashua, NH (US)

(73) Assignee: Anthony Donte Ebron, Nashua, NH (US)

( * ) Notice: Subject to any disclaimer, the term of this patent is extended or adjusted under 35 U.S.C. 154(b) by 0 days.

(21) Appl. No.: 17/364,986

(22) Filed: Jul. 1, 2021

(65) Prior Publication Data

US 2022/0004394 A1    Jan. 6, 2022

Related U.S. Application Data

(60) Provisional application No. 63/046,980, filed on Jul. 1, 2020.

(51) Int. Cl.
*G06F 9/4401* (2018.01)
*G06F 1/32* (2019.01)
*H04M 1/02* (2006.01)

(52) U.S. Cl.
CPC ......... *G06F 9/4406* (2013.01); *H04M 1/0202* (2013.01)

(58) Field of Classification Search
None
See application file for complete search history.

(56) References Cited

U.S. PATENT DOCUMENTS

| | | |
|---|---|---|
| 6,718,475 B2 | 4/2004 | Cai |
| 7,450,963 B2 | 11/2008 | Krishnan et al. |
| 7,898,994 B2 | 3/2011 | Zhao et al. |
| 7,990,912 B2 | 8/2011 | Nix, Jr. et al. |
| 8,266,213 B2 | 9/2012 | Crowder |
| 8,478,978 B2 | 7/2013 | Lin |
| 8,893,154 B2 | 11/2014 | Lin |
| 8,958,828 B2 | 2/2015 | Zheng |

(Continued)

FOREIGN PATENT DOCUMENTS

WO    WO-2012023150 A2 *  2/2012  ........... G06F 1/3206

OTHER PUBLICATIONS

Kumar et al., Smartphone's Hardware Architectures and Their Issues, May 31, 2014.

(Continued)

*Primary Examiner* — Fahmida Rahman (57) ABSTRACT

A multi-processor mobile computing device includes a first processor connected to a first operating memory and a mobile display and powered by a portable power source integrated into the multi-processor mobile computing device, a second processor connected to a second operating memory and a display input-output port; the second processor is activated only when mobile device is connected to an external power source. The device includes a dual-function operating system, including a mobile operating system module operating on the first processor, the mobile operating system module having a first capability set and a desktop operating system module operating on the second processor; the desktop operating system module having a second capability set, wherein the second capability set differs from the first capability set.

20 Claims, 7 Drawing Sheets

(56) References Cited

U.S. PATENT DOCUMENTS

| | | |
|---|---|---|
| 9,411,396 B2 | 8/2016 | Juang et al. |
| 9,804,857 B2 | 10/2017 | Sengupta et al. |
| 2010/0211769 A1 | 8/2010 | Shankar et al. |
| 2011/0078731 A1 | 3/2011 | Nishimura |
| 2012/0084793 A1* | 4/2012 | Reeves .................... G09G 5/14 |
| | | 719/318 |
| 2012/0159144 A1* | 6/2012 | Sengupta ................ G06F 9/441 |
| | | 713/100 |
| 2015/0334162 A1 | 11/2015 | Krishnamurthy |
| 2019/0065732 A1* | 2/2019 | Woo ........................ G06F 21/44 |
| 2019/0362533 A1* | 11/2019 | Fuller .................... G06T 15/40 |

OTHER PUBLICATIONS

Ocano, Remote Mobile Screen (RMS): An Approach for Secure Byod Environments, Apr. 30, 2015.

\* cited by examiner

FIG. 8 ered only when mobile device is connected to an external power source, and a dual-function operating system, the dual-function operating system including a mobile operating system module operating on the first processor, the mobile operating system module having a first capability set and a desktop operating system module operating on the second processor, the desktop operating system module having a second capability set, wherein the second capability set differs from the first capability set.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

MULTI-PROCESSOR MOBILE COMPUTING DEVICE

CROSS-REFERENCE TO RELATED APPLICATIONS

This application claims the benefit of priority of U.S. Provisional Patent Application Ser. No. 63/046,980, filed on Jul. 1, 2020, and titled "MULTI-PROCESSOR MOBILE COMPUTING DEVICE," which is incorporated by reference herein in its entirety.

FIELD OF THE INVENTION

The present invention generally relates to the field of computer architecture. In particular, the present invention is directed to a multi-processor mobile computing device.

BACKGROUND

Mobile devices such as smartphones are increasingly supplanting traditional computers such as laptop and desktop computers. However, existing mobile device technology is limited due to power and size constraints, and so is not able to fulfill many of the functions that traditional computers perform. This problem has stalled the transition that might otherwise occur to mobile devices.

SUMMARY OF THE DISCLOSURE

In an aspect, a multi-processor mobile computing device includes a first processor connected to a first operating memory, the first processor connected to a mobile display, wherein the first processor is powered by a portable power source integrated into the multi-processor mobile computing device, a second processor connected to a second operating memory, wherein the second processor is connected to a display input-output port and the second processor is activated only when mobile device is connected to an external

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments of the disclosed multi-processor mobile computing device include two processors: a first dedicated to performance of mobile tasks and design to operate off of a battery or similar portable power supply, and a second designed to perform a full range of computing tasks typically performed on desktop computers by virtue of access to an external power supply. Each processor has a dedicated operating system module that executes autonomously. Up to now, use of multiple processors in a desktop computer has been impractical due to the tendency to bottleneck; however, embodiments disclosed herein resolve this issue through use of dedicated task domains for each processor.

Figure 1:
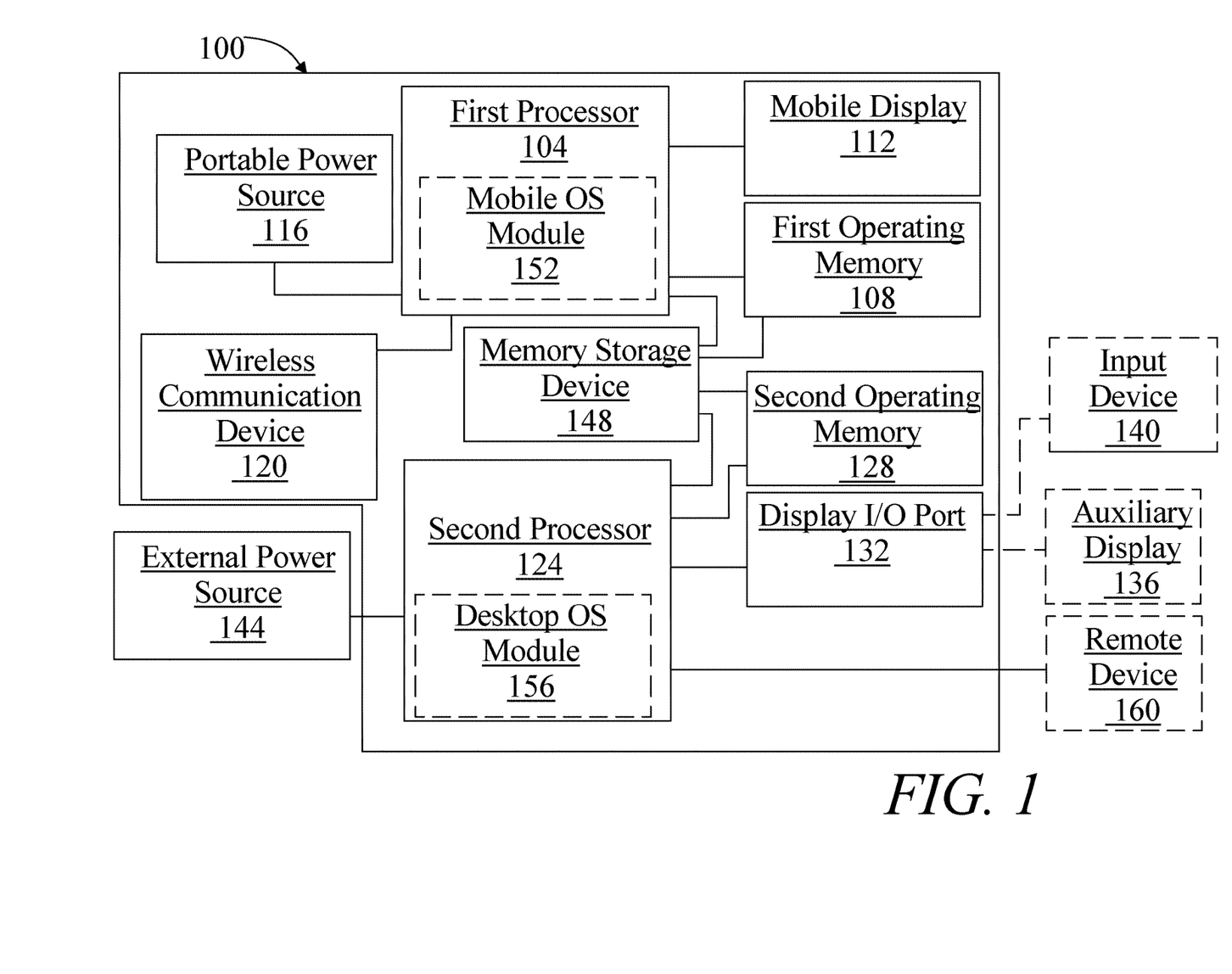
FIG. 1 is a block diagram illustrating an exemplary embodiment of a multi-processor mobile computing device.

Referring now to FIG. 1, an exemplary embodiment of a multi-processor mobile computing device 100 is illustrated. Multi-processor mobile computing device 100 may include any computing device as described herein, including without limitation a smartphone, a tablet, or other portable computing device; multi-processor mobile computing device may include a cellular-enable device that can place and/or receive telephone calls over a wireless call placement network, such as without limitation a cellular network incorporated in a publicly switched telephone network (PSTN). Multi-processor computing device includes a first processor 104. First processor 104 may include any processor as described in this disclosure. First processor 104 is connected to a first operating memory 108; first operating memory 108 may include any memory device as set forth in this disclosure, including without limitation any device suitable for use as random-access memory (RAM). First processor 104, first operating memory 108, and/or any other component connected to first processor 104 may be incorporated in a system on a chip (SoC). Connection to another component, as used herein, includes wired connection to the component, integration in and/or attachment to an integrated circuit including the component, inclusion of the component and first processor 104 together in an SoC, or the like. First processor 104 is connected to a mobile display 112. Mobile display 112 may include any display suitable for use in a mobile computing device, including a screen usable for a cellular phone and/or tablet. Mobile display 112 may include, without limitation, a touchscreen, which may permit a user to manipulate displayed elements by tapping, dragging, or otherwise providing tactile input to the screen using a finger, stylus, or other object; touchscreen may convert pressure and/or contact to electrical signals indicative of one or more locations of contact on the touchscreen. Persons skilled in the art, upon reviewing the entirety of this disclosure, will be aware of various additional or alternative forms and technologies that may be used for a mobile display 112 consistently with this disclosure. Mobile display 112 may be integrated in Multi-processor mobile computing device 100.

Still referring to FIG. 1, first processor 104 is powered by a portable power source 116 integrated into multi-processor mobile computing device 100. Portable power source 116 may include any power source suitable for use as a power source in a mobile computing device such a smartphone or tablet. As a non-limiting example, portable power source 116 may include a battery, including without limitation a lithium ion battery, a nickel cadmium battery, a nickel metal hydride battery, and/or any other rechargeable and/or single-use battery. Portable power source 116 may be connected to a recharging circuit, which may include a recharging port, an inductive charging unit, or the like. Persons skilled in the art, upon reviewing the entirety of this disclosure, will be aware of various alternative embodiments that may be used for portable power source 116, recharging circuit and the like; each such embodiment is contemplated as within the scope of this disclosure.

With continued reference to FIG. 1, first processor 104 may be connected to a wireless communication device 120. A wireless communication device 120, as used in this disclosure, is an electronic device that sends and receives signals via electromagnetic radiation, including without limitation radio waves; a wireless communication device 120 converts signals received via electromagnetic radiation into electronic signals to be provided to other electrical components such as without limitation first processor 104. A wireless communication device 120 converts electronic signals from other electrical components such as without limitation first processor 104 into electromagnetic signals. Transmission and reception of electromagnetic signals may be performed using an antenna (not shown), which may be integrated in and/or connected to wireless communication device 120. As a non-limiting example, connected to a baseband processor coupled to a cellular radiofrequency transceiver; a baseband processor as used herein is a processor, which may be any processor as described in this disclosure, that acts as a network interface to manage radio communication functions. A baseband processor may have its own RAM or other memory component, and may (hive an antenna, transceiver, and/or other wireless communication device 120 via one or more driver circuits.

Still referring to FIG. 1 multi-processor mobile computing device 100 includes a second processor 124. Second processor 124 may include any processor as described in this disclosure. Second processor 124 may be incorporated in computer architecture suitable for use in desktop and/or laptop computing; for instance, second processor 124 may be incorporated in a single board computer. Second processor 124 is connected to a second operating memory 128, which may include any memory suitable for use as first operating memory 108. Second operating memory 128 and first operating memory 108 may be separate from each other; alternatively second operating memory 128 and first operating memory 108 may be shared. First processor 104 may, as a non-limiting example, have read-only access to second operating memory 128. In an embodiment, read-only access to operating memory of first processor 104 permits second processor 124 to determine a current state of one or more programs and/or applications running on first processor 104 as described in further detail below. Second processor 124 may have read-only access to first operating memory 108.

With continued reference to FIG. 1, second processor 124 is connected to a display input-output port 132. Display input-output port 132, as used herein, may include any port suitable for connection to a display device that is not mobile display 112. Display input-output port 132 may be connected to an auxiliary display 136, defined herein as any display incorporated in and/or operating as a device exterior to multi-processor mobile computing device 100; including without limitation a computer monitor, television, a projector, and/or an audio output device such as a speaker. Second processor 124 may be configured to stream output to the auxiliary display 136. Display input/output port and/or second processor 124 may be connected to an auxiliary input device 140, defined herein as any input device 140 exterior to multi-purpose mobile computing device 100, including without limitation a keyboard, game controller, mouse, touchpad, touchscreen, or the like. Input device 140 140 may include, without limitation a microphone as described below; multi-processor mobile computing device 100, first processor 104, and/or second processor 124 may use speech-to-text software and/or technology to convert audio inputs into text. Display input/output port may include any suitable wired or wireless input/output port, including without limitation a wired high-definition multimedia interface (HDMI) port a wireless HDMI port, a device and/or transceiver, a Bluetooth device and/or transceiver, wireless communication device 120, or any other related technology that may occur to persons skilled in the art upon reviewing the entirety of this disclosure.

Alternatively or additionally, and still referring to FIG. 1, multi-processor mobile computing device 100 may be portless. As used in this disclosure, a device that is "portless" is a device that does not use any direct wired connection to any external device; a portless device may perform charging and data exchange, including without limitation software and/or firmware installation, upgrade, updates, or the like, entirely wirelessly. Multi-processor mobile computing device 100 may be solely portless, without any physical means to access circuit elements and/or components using conductive connections. Alternatively, Multi-processor mobile computing device 100 may function in a portless mode, which may be a default mode, but include one or more ports and/or conductive connections that are capable of being used as an alternative to wireless communication.

Still referring to FIG. 1, second processor 124 may be activated only when mobile device is connected to an external power source 144; for purposes herein, "activated" means operating in any mode except a power-down sequence as described below. An external power source 144, as used herein, is a power source that is not integrated in multi-processor mobile computing device 100. External power source 144 may include a wired power source that provides power to multi-processor mobile computing device 100 via wired connection such as without limitation a "charging port" such as a micro universal serial bus (USB) port, a USBC port, a LIGHTNING port as produced by Apple, Inc. of Cupertino, Calif., or the like. External power source 144 may include a wireless power source such as an inductive charger and/or charging pad. External power source 144 may be connected to mains power or to a local generator, solar cell, or the like Second processor 124 may be activated upon connection of multi-processor mobile computing device 100 to external power source 144 by any suitable means. For instance, and without limitation, first processor 104 may activate second processor 124 upon detecting that external power source 144 is connected. As a further non-limiting example, second processor 124 may have a boot-up switch such as a transistor, circuit, or the like that triggers second processor 124 to switch on upon connection. Alternatively, or additionally, a user may activate a switch or enter a manual command causing second processor 124 to activate upon connection of multi-processor mobile computing device 100 to external power source 144. Second processor 124 may deactivate automatically when multi-processor mobile computing device 100 is disconnected from external power source 144; this may be accomplished by any means described above for automatic activation of second processor 124. Alternatively or additionally, a user may activate a switch or enter a manual command causing second processor 124 to deactivate. Deactivation may initiate a power-down sequence in which a session state of an operating system module and/or an application executing thereon, as described in further detail below, is saved to a memory storage device 148 prior to switching off second processor 124 and/or second operating memory 128.

With continuing reference to FIG. 1, memory storage device 148 may include any memory device as described in this disclosure, including without limitation a solid-state persistent storage device; memory storage device 148 may include, as a non-limiting example, micro secure digital (SD) memory, Memory storage device 148 may be accessible to first processor 104 and/or second processor 124. Second processor 124 may connect to one or more additional components, including without limitation a graphical processing unit (GPU).

Still referring to FIG. 1, multi-processor mobile computing device 100 includes a dual-function operating system. An operating system, as defined herein, is a program that controls hardware devices and/or components of a computing device using at least a kernel, coordinates execution of applications using at least a program execution interface and manages memory. Dual-function operating system includes a mobile operating system module 152 operating on the first processor 104; in other words, first processor 104 is programmed to execute first operating system module, which is stored in memory accessible to first processor 104 and may use first operating memory 108 as its operating memory, i.e. to instantiate function call stacks and the like. Mobile operating system module 152 may include a mobile operating system kernel that manages components accessible to first processor 104, such as without limitation first operating memory 108, mobile display 112, wireless communication device 120, and the like. Mobile operating system module 152 has a first capability set; first capability set may include operation of mobile hardware and/or software components, including components exclusively connected to first processor 104 and/or components connected to both first processor 104 and second processor 124, such as mobile display 112, wireless communication device 120, and other components listed in this disclosure. First capability set may include, without limitation, any capabilities associated with a smartphone and/or tablet operating system and/or applications operating therewith. For instance, and without limitation, first capability set may include wireless call placement and/or reception. First capability set may further include restricted non-administrative access to desktop operating system module 156, such as without limitation read-only access to second operating memory 128; read-only access may be used, as a non-limiting example, to determine a state of operating system elements and/or applications executed by second processor 124.

With continued reference to FIG. 1, dual-function operating system includes a desktop operating system module 156 operating on the second processor 124. Desktop operating system module 156 may include, without limitation, a kernel operating on second processor 124. Desktop operating system has a second capability set; the second capability set differs from first capability set. For instance, desktop operating system may lack the ability to place cell calls; in other words, second capability set may exclude call placement. Second capability set may include any capability associated with desktop operating systems and/or with applications executing on desktop operating systems. Second capability set may include, without limitation, a restricted non-administrative access to mobile operating system module 152 and/or applications operating on mobile operating system module 152; for instance, second capability set may include a read-only access to first operating memory 108, permitting desktop operating system module 156 to access states of mobile operating system and/or of applications executing thereon. Desktop operating system module 156 may automatically activate when the multi-processor mobile computing device 100 is connected to external power source 144. Desktop operating system module 156 may deactivate when multi-processor mobile computing device is disconnected from second power source. Deactivation may include a power down sequence in which data stored in second operating memory 128, such as a current state of mobile operating system module 152 and/or one or more applications operating thereon.

Still referring to FIG. 1, desktop operating system module 156 may operate as a thin-client module in connection with at least a remote device 160, which may include any computing device as described herein; a thin-client module, as used herein, is a module that uses at least a remote device 160 to perform one or more storage and/or program execution tasks instead of the device on which the thin-client module is operating. For instance, and without limitation, a thin-client module may use cloud data storage, wherein at least remote device 160 stores one or more elements of data instead of local data storage devices; data to be stored may be transmitted via any wired or wireless network connection, such as without limitation a connection established via wireless communication device 120, to at least a remote device 160 for storage, and data to be retrieved may be retrieved, for instance in response to a query identifying such data, via any such network connection. As a further non-limiting example, one or more programs called or initiated by processes operating on thin client module may be executed on a cloud processing facility operating on at least a remote device 160; for instance, a function call may be transmitted to at least a remote device 160 over a network connection as described above, and/or outputs of such a program may be received from at least a remote device 160 over such a connection.

With continued reference to FIG. 1, desktop operating system module 156 may be configured to use mobile display 112 as a secondary display. For instance, and without limitation, desktop operating system may display "quick-access" buttons on mobile display 112 to activate and/or toggle between desktop applications. In an embodiment, desktop operating system module 156 may be configured to use mobile display 112 as a locator device in a display connected to display input-output port 132; a locator device, as used herein, is a device by means of which a user may move a cursor on a display, highlight items displayed thereon, select items displayed thereon; and/or activate one or more event handlers, such as without limitation buttons, links, or the like. Examples of locator devices include without limitation, a computer mouse, a touchscreen, a touchpad, a joystick, or the like. For instance, when used by desktop operating system module 156 as a locator, a mobile display 112 including a touchscreen may operate like a touchpad, where motion of a finger across mobile display 112 may cause a corresponding and/or proportional motion across a display connected to display input/output port; tapping or performing an act on mobile display 112 that functions as a selection on mobile display 112 may, when mobile display 112 is functioning as a selector, may occasion a selection input to be performed with respect to an element displaying on an auxiliary display 136.

In an embodiment, and still referring to FIG. 1, first processor 104 may be configured to remain active while the desktop operating system module 156 is operating. Mobile operating system module 152 may remain active while desktop operating system module 156 is operating. In an embodiment, mobile operating system and desktop operating system may communicate with each other; for instance and without limitation, desktop operating system and mobile operating system may pass arguments to each other and/or store information in shared memory.

Still referring to FIG. 1, one or more elements of multi-processor mobile computing device 100 may communicate with one or more additional elements thereof in any suitable manner, including without limitation wired and/or wireless connections and/or coupling. For instance, and without limitation, two or more elements may be connected to each other by a bus or other wired or conductive connection. As a further example, two or more elements may be connected to one another using a wireless pairing protocol such as the BLUETOOTH protocol of Bluetooth SIG, Inc. of Kirkland, Wash. Such wireless pairing and/or intercommunication may be performed using one or more transceivers, each of which may have a control circuit such as a processor and/or microcontroller; such a processor and/or microcontroller may connect to a bus and perform communications thereon with other elements connected thereto, for instance and without limitation acting as a "stand-in" or proxy for the wirelessly connected element on the bus. As a non-limiting example, first processor 104 may connect to memory storage device 148, mobile display 112, first operating memory 108, and/or wireless communication device 120 by way of a conductive connection and/or bus, while connecting to second processor 124, second operating memory 128, and/or display I/O port 132 via a wireless connection; each of the second processor 124, second operating memory 128, and/or display I/O port 132 via a wireless connection may similarly connect to one or more of second processor 124, second operating memory 128, and/or display I/O port 132 via a wireless connection via another conductive bus. Continuing the example, a first transceiver (not shown) may connect conductively to first bus and a second transceiver (not shown) paired or in wireless communication with the first transceiver may connect conductively to second bus; these two transceivers may enable elements connected to first bus to communicate with elements connected to second bus, creating a virtual shared bus. In an embodiment, first processor and/or components connected conductively thereto may be housed separately from second processor and/or components connected conductively thereto; separate housings may include without limitation two halves of a folding embodiment as described in further detail below.

Figure 2A:
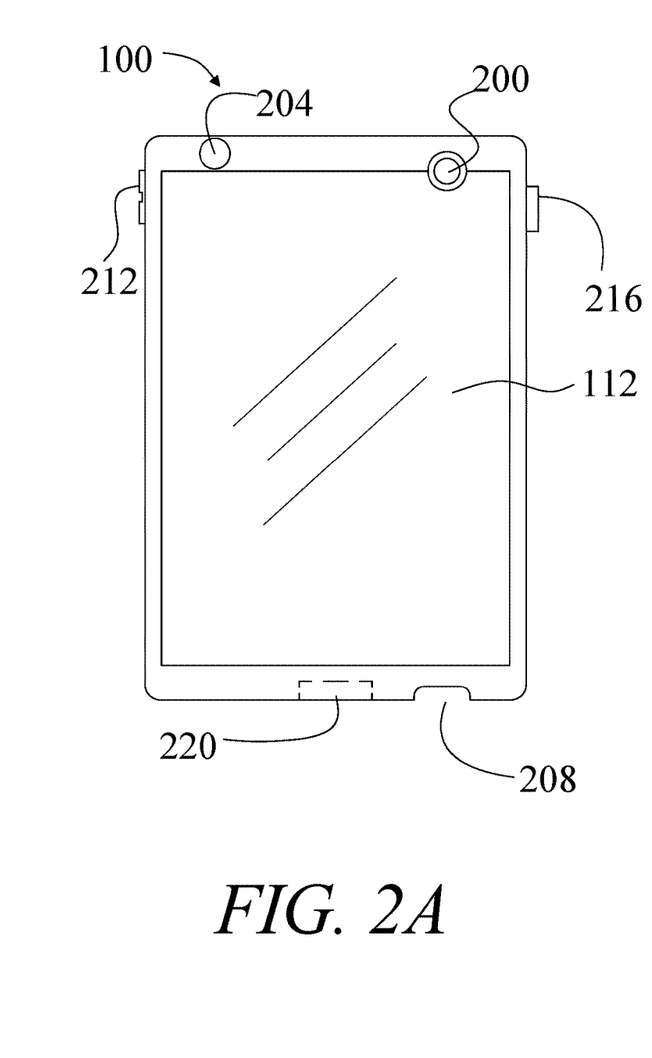
FIGS. 2A-B are schematic diagrams illustrating front and rear views of an exemplary embodiment of a multi-processor mobile computing device.

Turning now to FIG. 2A, an exemplary embodiment of a front of multi-processor mobile computing device 100 is illustrated. Multi-processor mobile computing device 100 includes a mobile display 112, which may perform, or be used to perform, any tasks, processes, or the like as described above. Multi-processor mobile computing device 100 may include a camera 200; camera 200 may be any digital camera suitable for use in a mobile device. Multi-processor mobile computing device 100 may include at least speaker 204 or other audio output device for audio output; speaker may, for instance, use piezoelectric components to convert an electrical signal to an audio signal. At least a speaker 204 may include a plurality of speakers and/or audio output devices. Multi-processor mobile computing device 100 may include an audio input device 208 such as a microphone; audio input device 208 may include any device that converts an audio signal to an electric signal. Multi-processor mobile computing device 100 may include a volume control 212 that modifies amplitude of sound output by at least a speaker 204; there may be additional output modes, such as a "speaker phone" mode whereby an elevated volume is output to permit a user to engage in conversations at some distance from multi-processor mobile computing device 100 and/or a mute mode whereby no sound is admitted. Multi-processor mobile computing device 100 may include a power button 216. Multi-processor mobile computing device 100 may include a two-way USB port 220. Two-way USB port 220 may be used to transmit data into and/or out of multi-processor mobile computing device 100.

Figure 2B:
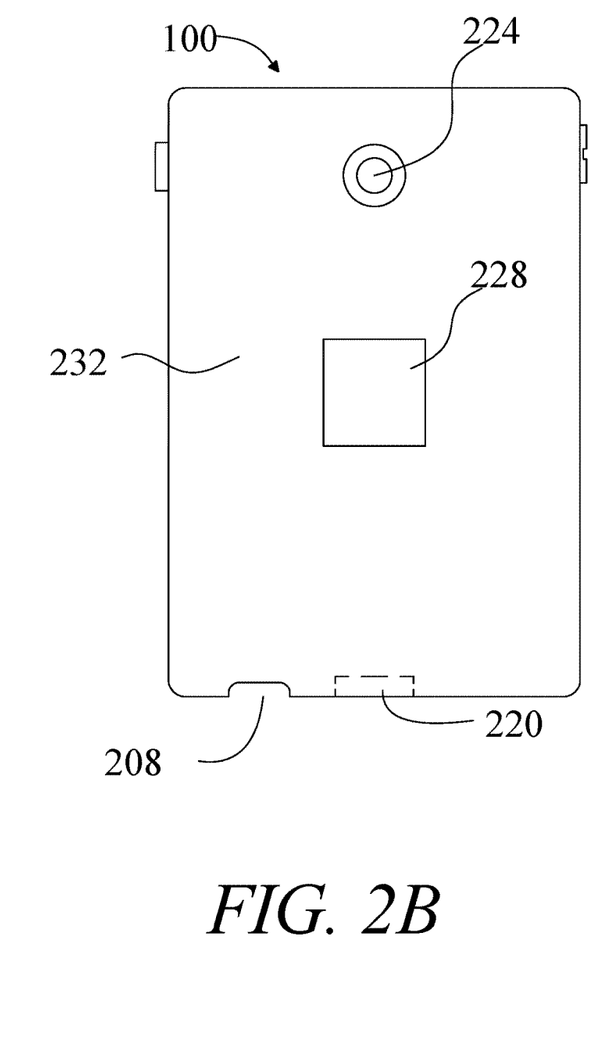

Referring now to FIG. 2B, an exemplary embodiment of a rear or back view of multi-processor mobile computing device 100 is illustrated. Multi-processor mobile computing device 100 may include a rear-facing camera 224, which may include any device suitable for use as camera 200. Multi-processor mobile computing device 100 may include a fingerprint scanner 228 or other biometric input device 140, which may be used to cryptographically secure and/or unlock multi-processor mobile computing device 100; passwords, personal identification numbers (PINs) and/or symbolic access codes may alternatively be used to authenticate users and cryptographically lock or unlock multi-processor mobile computing device 100. A housing 232 of multi-processor mobile computing device 100 may contain any or all components thereof as described above; housing 232 may be constructed of any suitable material or combination of materials, including without limitation metals, natural or artificial polymers such as without limitation plastic, silicone, or rubber, wood, bamboo, textiles, and/or leather.

Figure 3:
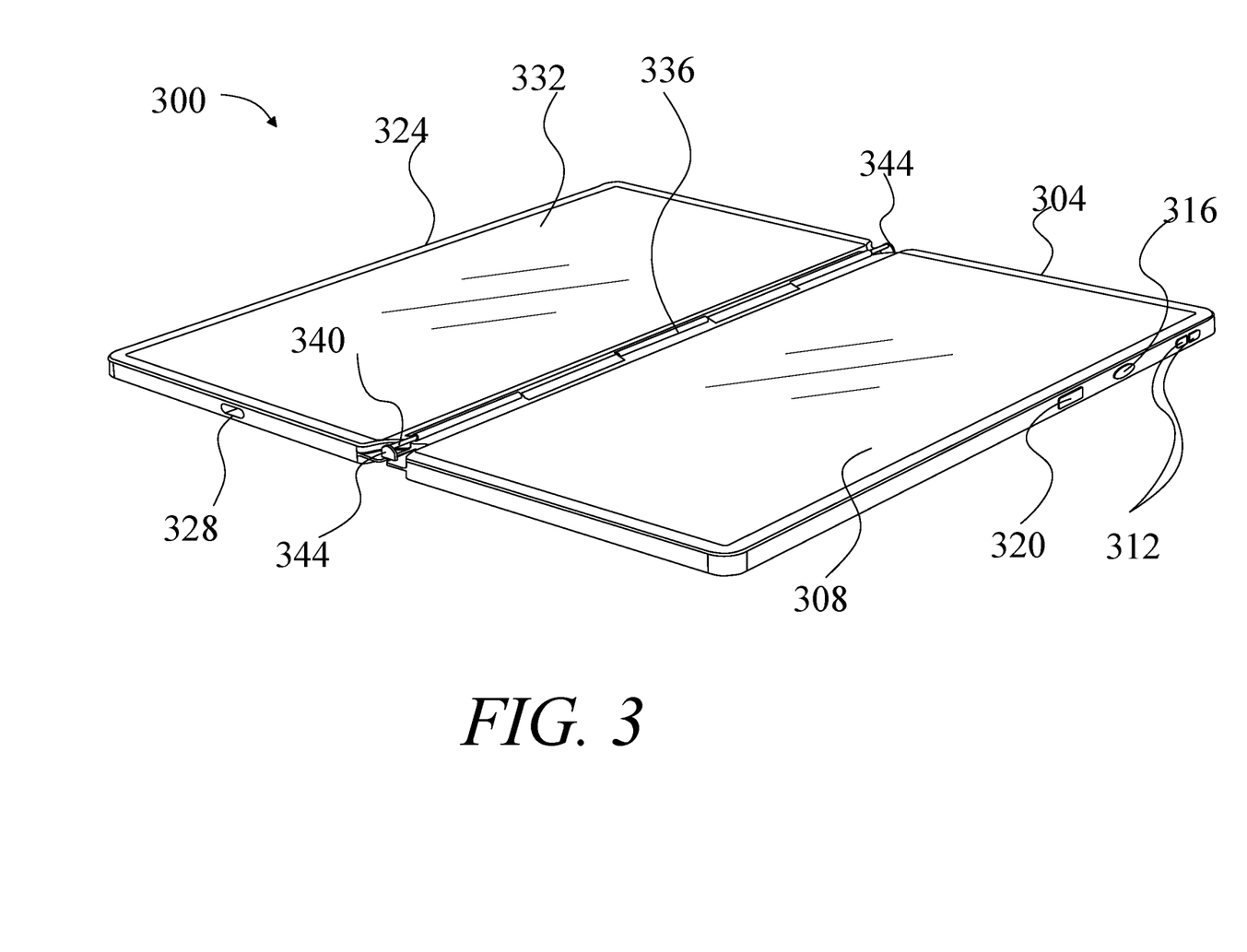
FIG. 3 is a schematic diagram illustrating an exemplary embodiment of a dual processor device.

Referring now to FIG. 3, an exemplary embodiment 300 of device having a folding configuration is illustrated. A first member 304 may include a first display 308. First display 308 may include any display as described in this disclosure. First member 304 may include, without limitation first processor 104 and/or one or more elements communicatively and/or electronically connected thereto, such as without limitation one or more elements connected to a first bus as described above, portable power source 116, or the like. First member may include one or more manual interfacing devices, such as volume control buttons 312, a power button 316, a function button 320, or the like; first display 308 may alternatively or additionally include a touch-screen display.

Still referring to FIG. 3, exemplary embodiment 300 may include a second member 324. Second member may include, without limitation, second processor 124 and/or one or more elements connected thereto for instance via a second bus as described above. Second member may include a port 328 for connection to external power source 144; alternatively or additionally, second member may include an inductive charging component and/or element. Second member may include a second display 332, which may be implemented in any manner suitable for implementation of mobile display 112, first display 308, and/or auxiliary display 136. Second display 332 may include a touchscreen. Second member may include, without limitation, any or all elements described above for device 100 and/or first member 304.

With continued reference to FIG. 3, first member 304 may be joined to second member 324 by a hinge 336 permitting first member 304 and second member 324 to be folded together. Hinge 336 may include a shaft 340 inserted through annular or sleeve-shaped extensions of first member 304 and second member, permitting rotation of such annular and/or sleeve-shaped extensions about the shaft 340. Shaft 340 may have flanged cap elements 344 at one or more ends of shaft to prevent detachment of first member 304 and/or second member 324 from shaft 344. First member 304 and/or second member 324 may have slots that slidably admit cap elements such that rotation of annular and/or sleeve-shaped extensions about shaft causes slots to slide over cap elements 344; cap elements 344 may have curved and/or arcuate edges about which slots can slide. Annular and/or sleeve-shaped extensions of first member 304 and second member 324 may be interleaved or alternating.

Figure 4:
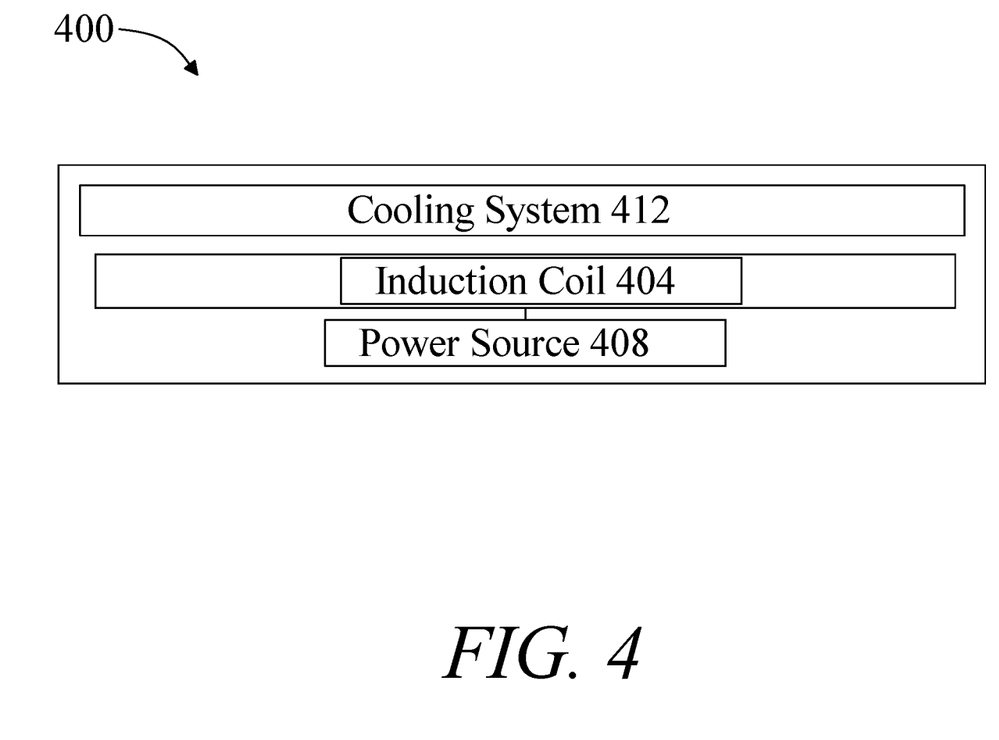
FIG. 4 is a block diagram illustrating an exemplary embodiment of a dock.

Referring now to FIG. 4, a block diagram of an exemplary embodiment of a dock 400 to be used with device 100 is illustrated. Dock 400 may include an induction coil 404 for transferring power inductively to device 100. Induction coil 404 may be connected to a power source 408. In some embodiments, power source 408 may include an electrical connection to mains power or another external power source. Alternatively or additionally, power source 408 may include an internal power source such as a generator, fuel cell, battery, or the like. In an embodiment, inductive coil 404 may be driven by an inductive charging driver circuit, which may drive a varied electric current through coil to produce a varying magnetic field. This may be accomplished using alternating current power provided from power source 408 where power source use alternating current; alternatively, where power source is direct current, electric current may be varied using one or more inverters.

Still referring to FIG. 4, dock 400 may include a cooling system 412. Cooling system 412 may extract waste heat from elements of dock 400 such as induction coil 404, power source 408 or the like. Cooling system 412 may alternatively or additionally extract waste heat from device 100; where device 100 is connected to external power source 408 via dock 400, device may operate in "desktop mode" as described above, and as a result of higher-speed computation and higher power consumption may produce greater quantities of excess heat. Device 100 may have one or more exterior surfaces composed at least in part of heat-conductive materials such as aluminum. Cooling system 412 may use a combination of conduction, convection, and/or other methods to cool heat-conductive surface of device 100, which may in turn remove waste heat from device. Such methods may include, without limitation, circulation of cooling liquids and/or heat pumps between heated surfaces and relatively cold reservoirs which may include systems of cooling vanes, fans, or the like.

Figure 5:
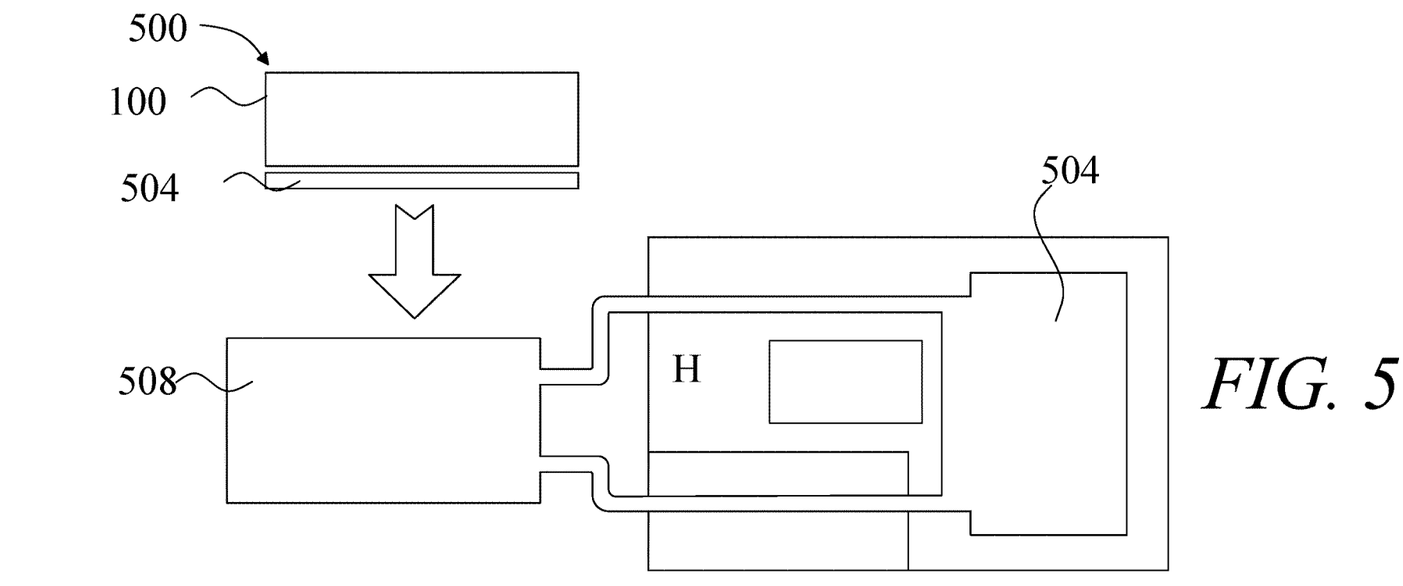
FIG. 5 is a block diagram illustrating an exemplary embodiment of a magnetic refrigeration system.

Referring now to FIG. 5, cooling system 412 may include a magnetic refrigeration system 500. Device 100 may interface with a heat conductor 504, which may include without limitation any substance, object, and/or system to transfer heat away from device and to cooled refrigeration material 508. Refrigeration material 508 may include any suitable material for absorbing and transporting heat through one or more conduits; conduits may include without limitation pipes, tubes, heat pipes, or the like. Refrigeration material may provide heat to a magnetic material 512 such as without limitation $Gd_5(Si_xGe_{1-x})_4$, $La(Fe_xSi_{1-x})_{13}Hx$ and/or $MnFeP_{1-x}As_x$ alloys, $Ni_2Mn$—X alloys where X may include Ga, Co, In, Al, and/or Sb, and/or any other ferromagnetic material. Refrigeration material 508 may be thermally isolated from magnetic material 512 during some adiabatic phases of magnetic refrigeration, and allowed to contact magnetic material 512 during other phases. Isolation may be achieved by cessation of flow using one or more valves or the like. Magnetic material 512 may similarly be connected to one or more cooling sources such as fans, conductive vanes, or the like; connection maybe severed or minimized for adiabatic phases of magnetic refrigeration process as described in further detail below.

Figure 6:
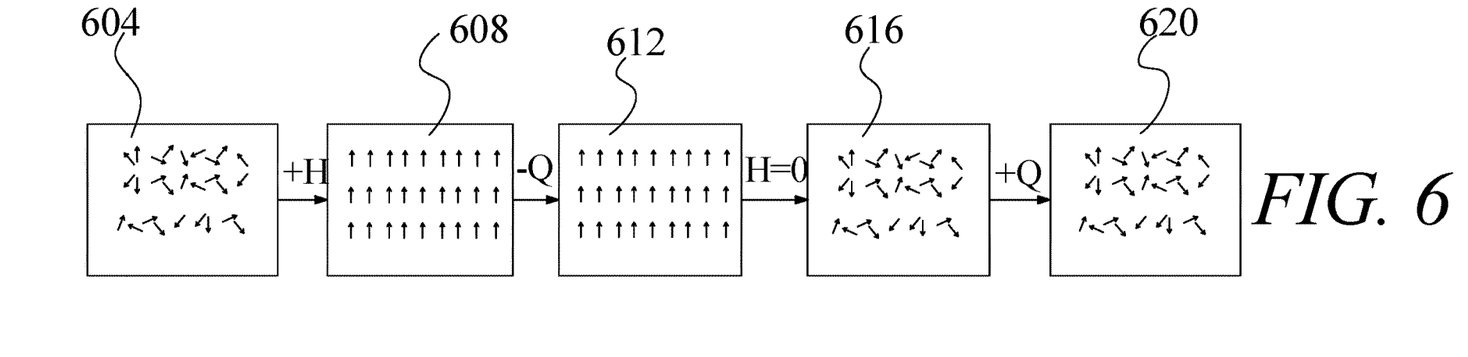
FIG. 6 is a block diagram illustrating an exemplary embodiment of a thermodynamic process for magnetic refrigeration.

Referring now to FIG. 6, an exemplary embodiment of a thermodynamic process for magnetic refrigeration is illustrated. Initially, magnetic material is non-magnetized 604, having magnetic dipoles that are not aligned. In an adiabatic condition, defined as a condition during which very little heat is exchanged with other substances, the magnetic material is exposed to a magnetic field, aligning the dipoles 608. This causes an increase in temperature according to the formula:

$$\Delta T_{ad} = - \int_{H_0}^{H_1} \left(\frac{T}{C(T,H)}\right)_H \left(\frac{\partial M(T,H)}{\partial T}\right)_H dH$$

where the integral is evaluated over H the imposed magnetic field, at temperature T, C is the heat capacity of the magnetic material, and M is the magnetization of the magnetic material. At 612, the magnetized magnetic material is exposed to a cooler reservoir, such as cooling devices as described above, which allows heat to flow out of the material. At 616, the magnetized material is put into an adiabatic condition again and then the magnetic field is removed, causing the temperature of the magnetic material to drop according to the same equation. This cold material is then exposed 620 directly or indirectly to the waste heat from device 100, cooling device 100 while raising the temperature of the magnetic material. This cycle may be repeated to cool the device 100.

Above-described embodiments of multi-processor mobile computing device 100 may present various advantages over existing devices. A process of having two separate yet harmoniously functioning operating systems on a single device, each with a dedicated processor, obviates the need to choose between contradictory and/or competing design considerations, such as the traditional and ubiquitous trade-off between processing speed and power consumption; similarly, use of thin-client processes may enable a multi-processor mobile computing device 100 to augment its computing power and/or to expand data storage without sacrificing local storage space. Advantageously, multi-processor mobile computing device 100 may be able to operate as a fully function mobile device as well as a fully functional desktop-style computing device.

In operation, when multi-processor mobile computing device 100 is powered on, device may sync with external displays and Bluetooth accessories such as without limitation controllers, speakers, keyboards and/or mice; syncing may be automatic in the case of devices that have previously been synced. Alternatively or additionally, multi-processor mobile computing device 100 may prompt user to sync with such device and/or receive user commands to sync with such devices. User may also interact with the multi-processor mobile computing device 100 directly to have multi-processor mobile computing device 100 request to sync with external devices. Cloud computing may be performed over any wired or wireless network, including without limitation Wi-Fi. Wireless card and Bluetooth capabilities may be embedded into multi-processor mobile computing device 100.

Figure 7:
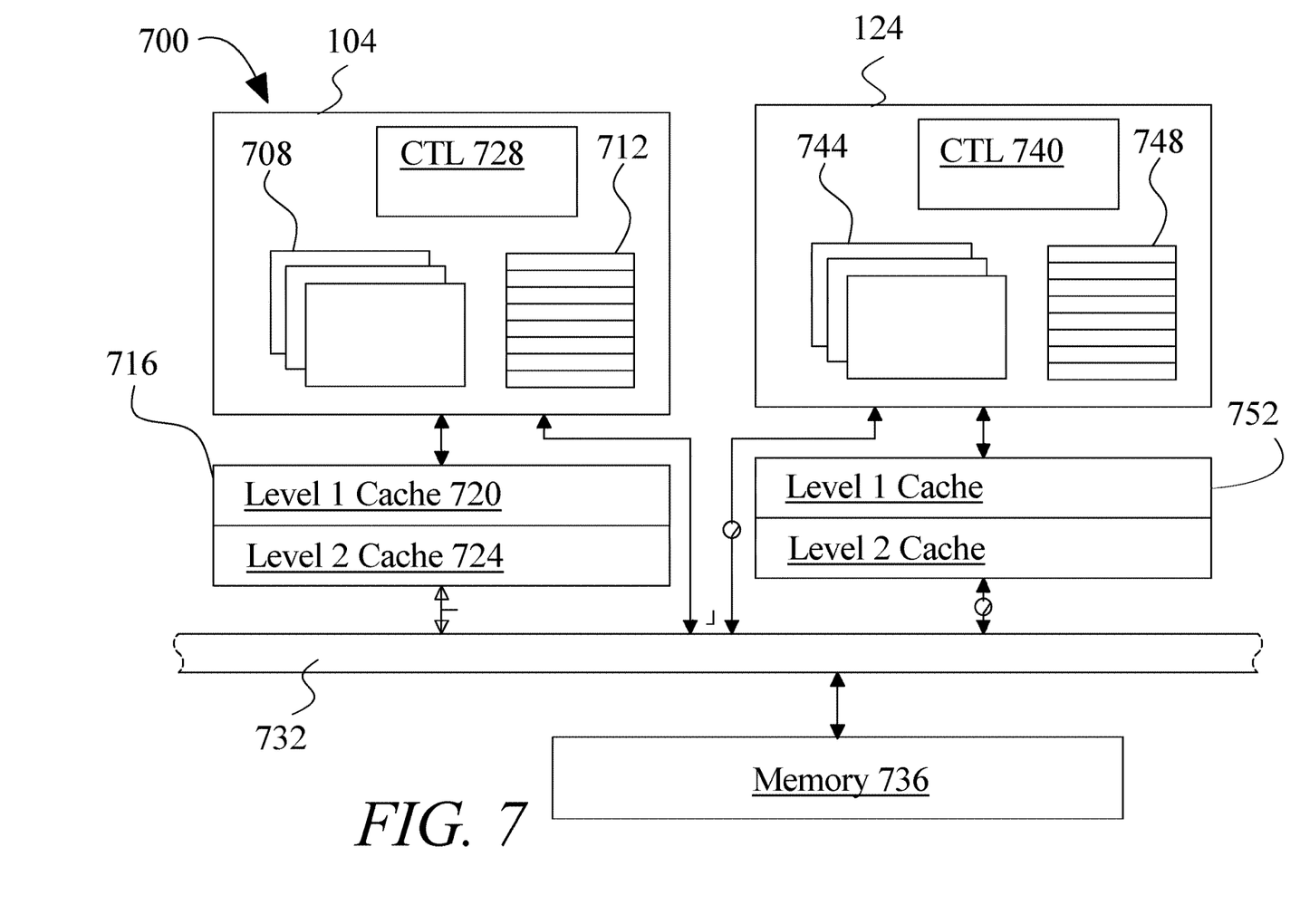
FIG. 7 is a blog diagram illustrating an exemplary embodiment of an architecture of dual processor device.

Referring now to FIG. 7, an exemplary embodiment of a system architecture 700 which may be implemented with device 100 is illustrated. In an embodiment, each of first processor 104 and/or second processor 124 may be connected to a data bus 704. Data bus 704 may connect selectively to second processor 124, or may be connected whether or not second processor is enabled. First processor 104 may include one or more computational units (CU) 708, which may include, without limitation, arithmetic and logic units (ALU), floating point units (FPU), and/or elements thereof such as multipliers, dividers, adders, or the like. First processor 104 may include one or more registers 712, which may be used to store data fetched from memory, data output by one or more instructions, or the like. Registers 712 may include, without limitation, registers that store computational unit and/or instruction stage outputs, buffers storing data to be input to CUs 708, outputs of memory load instructions, or the like. Registers may be used for pipelining, multithreading, or the like, for instance and without limitation as described in further detail below. First processor 104 may communicate with and/or include a first memory cache 716, which may be used to enhance efficient retrieval from memory. A cache may be implemented using very fast access time memory such as static random-access memory (SRAM), in which each bit is stored in a flip-flop, similarly to registers. Cache 716 may be implemented using any cache architecture including without limitation direct-mapped cache architecture, fully associative cache architecture, and/or set-associative cache architecture. Updates to cache and/or memory data may be performed according to any suitable protocol, including without limitation write-through and/or write-back protocols.

Continuing to refer to FIG. 7, cache 716 may be implemented as part of and/or may implement a tiered and/or hierarchical memory access protocol. For instance, cache 716 may include a level 1 cache 720, which may be a small cache from which data words can be retrieved very rapidly, a level 2 cache 724 which may have a slower retrieval speed and a greater memory capacity than level 1 cache 720; in an embodiment, first processor 104 may attempt to retrieve memory from level 1 cache 720 first, from level 2 cache 724 second if level 1 cache does not have the sought memory, and memory storage device 148 third, if second level cache does not have the sought memory. Cache levels may be extended using second processor where available, using a shared memory hierarchy as described in further detail below.

Still referring to FIG. 7, architecture 700 may include a bus 732. Bus may pass data and/or instructions between processors, between processors and memory, and/or between elements of a processor. For instance, and without limitation, bus 732 may connect CUs, registers, control, and/or other elements of processors, for instance and without limitation as described in further detail below. Architecture 700 may include multiple buses; for instance, and without limitation, there may be one bus in first processor 104, another bus in second processor 124, and/or a third between processors and memory elements or the like. Any such buses may be combined into a single bus; for instance, and without limitation, all elements of first processor 104 and second processor 124 may be connected to one another using a bus such as a common data bus as described in further detail below.

Further referring to FIG. 7, registers and/or bus may be used, without limitation, to store and/or forward to other registers and/or CUs results of execution steps, outputs of CUs, results of memory retrieval, cache retrieval results, and/or any other message that may be passed on bus 732. For instance, and without limitation, where first processor 104 is pipelined, execution of any given instruction may be performed in stages, such as instruction retrieval, instruction decoding, computation, program counter incrementation, memory storage and/or retrieval, or the like. Outputs of each such stage may be shared on bus 732, stored in one or more registers 712, and/or forwarded to one or more registers and/or CUs.

As a non-limiting example, and with further reference to FIG. 7, bus 732 may function within first register as a common data bus (CDB). CDB may be connected to outputs of each functional unit and may connect in turn to the inputs of all data storage and/or reservation station registers as described in further detail below. As a result, CDB may be able to immediately pass an output of any functional unit to an input of any other functional unit and/or a register that stores inputs for the function unit, which may be known as a "reservation station." In an embodiment, this may mean that an output of an instruction destined for a particular data register may be "forwarded" to execution of a subsequent instruction depending on that output, whether or not a register to be updated has actually received a value yet. Which unit is currently enabled to pass messages on the CDB may be coordinated by a "control path," defined as controller 728 plus any circuitry connecting the controller 728 to other elements of first processor 104. Controller 728 may also transmits, via control path and/or with each entry on CDB, elements of data indicating sources of data for subsequent registers and/or functional units; for instance, controller 728 may transmit a datum on CDB with each element of data transmitted thereon called a "tag," which may be used for register renaming processes.

In an embodiment, each functional unit of first register 104 may include a buffer of registers, which may be described as a "reservation station" at which operands to be input to the instant functional unit may be stored. A purpose of reservation stations may be to store each operand as it becomes available, until all operands needed for an operation are available, at which point a computation phase of an instant instruction may move forward. There may be multiple different functional units, so that while one is occupied either computing a value or awaiting delivery of operands, others may perform further computations. Each functional unit may also have an output register where the output of the functional unit is stored.

In an embodiment, use of registers such as reservation stations, augmented with forwarding, such as using bus 732 and/or CDB, may permit instructions to be performed out of order when ready. One or more elements of data may be used to track dependencies of registers on each and/or on functional unit outputs, to ensure correct orders of operations. In an embodiment, and as an illustrative example, this may be accomplished using two busy bits and tags. Busy bits, may be assigned, as a non-limiting example, at one bit per register. A busy bit may indicate whether a corresponding register is scheduled to receive a value from a currently executing instruction. Controller 728 may be designed to prevent overwriting a register when it is busy as indicated by a busy bit.

In an embodiment, and still referring to FIG. 7, given busy bits to prevent incorrect overwriting of registers, reservation stations to save up operands, and/or a bus 732, CDB, or other forwarding mechanism to forward results rapidly between functional units and reservation stations, tracking which outputs are to be delivered to which reservation stations and data registers may be accomplished using an additional data field, which may be called a "tag." Each register may include a binary or other code, called a tag, which may function as a name for that register within first register 104. Each register may also have a tag field, where a tag of a register from which that register is to receive its next value may be stored. In a non-limiting example, whenever a value is output on a bus 732, CDB, and/or other mechanism a tag of a register from which that output is being issued may also be issued. Registers listing that tag in their tag field may be overwritten by that output. In an embodiment, this will have the result that data registers are continually updated with new tags indicating where values to be stored on those data registers are coming from as new instructions are generated, preserving dependencies and ensuring that an ultimate value arriving at a data register after a series of instructions is the correct value.

With continued reference to FIG. 7, architecture 700 may include a memory 736. Memory 736 may include a shared memory available to both first processor 104 and second processor 124 and/or one or more dedicated memories of first processor 104 and/or second processor 124 which may or may not be connected to the other processor directly or indirectly. Memory may connect to first processor 104 and/or second processor via bus 732; connection may be direct and/or may be via cache 716. Memory may be implemented, without limitation, using dynamic RAM and/or other forms of RAM. Memory may further include and/or communicate with storage and/or secondary memory as described in further detail below.

With further reference to FIG. 7, architecture 700 may include second processor 124, which may be implemented in any manner described above. Second processor 124 may include any element suitable for inclusion in first processor 124, including without limitation control 740, CU or functional units 744, registers 748, and/or a cache 752, which may have any hierarchy suitable for use as cache 716. Second processor 124 and/or any element thereof may be connected to bus 732, a CDB, and/or other intercommunication connections; second processor 124 may use any processes for buffering, forwarding, register renaming, or the like as described above.

Still referring to FIG. 7, in an embodiment, CUs and/or registers of both first processor 104 and second processor 124 may be combined to perform some instructions and/or sets of instructions. For instance, tags have sufficient length to label all registers and CUs of both processors together, such that a reservation station and/or data register in one may be configured to receive an output from another. In an embodiment, when one processor, such as second processor 124 is disabled or switched off, contents of its registers may be written to registers of the other processor and/or to memory locations, and tags of other processor may be updated to tags of data registers to which those contents were written and/or to registers dedicated to load instructions from such memory locations; load instructions may be automatically generated by control 728 or the like, for instance and without limitation using forwarding logic incorporated in and/or communicating with control 728 and/or control 740. Registers and CUs of second register may be flagged as unavailable when second register is disabled. Where second processor 124 is initially disabled and is subsequently enabled, registers and/or CUs of second processor 124 may be flagged as enabled, and subsequently may be used to perform instructions and/or to store data.

Still referring to FIG. 7, when a register such as without limitation second register 124 is switched off, its cache may be written to memory 736 and/or cache 716. For instance, and without limitation, a level of cache 752 may be written to free space in cache 716 and/or a level thereof in order of priority until cache 716 and/or a level thereof has no free space, in which case contents of cache 752 may be written to a lower level and/or to memory 736. In an embodiment, and without limitation, level 1 of cache 752 may be written to level 2 of cache 716. When both processors are operational, first processor 104 may treat cache of second processor as an extended level cache, and vice versa; that is, first processor 104 may, on cache miss to cache 716 level 1 and then level 2 attempt to read from levels 1 and then 2 of cache 752 before accessing memory 736 and/or storage. In an embodiment, level 1 and 2 caches of second processor may function as off-chip cache levels (i.e., levels 3 and 4) for first processor, and/or vice-versa. In an embodiment, this may enable more efficient memory access than retrieving from memory on every cache miss.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
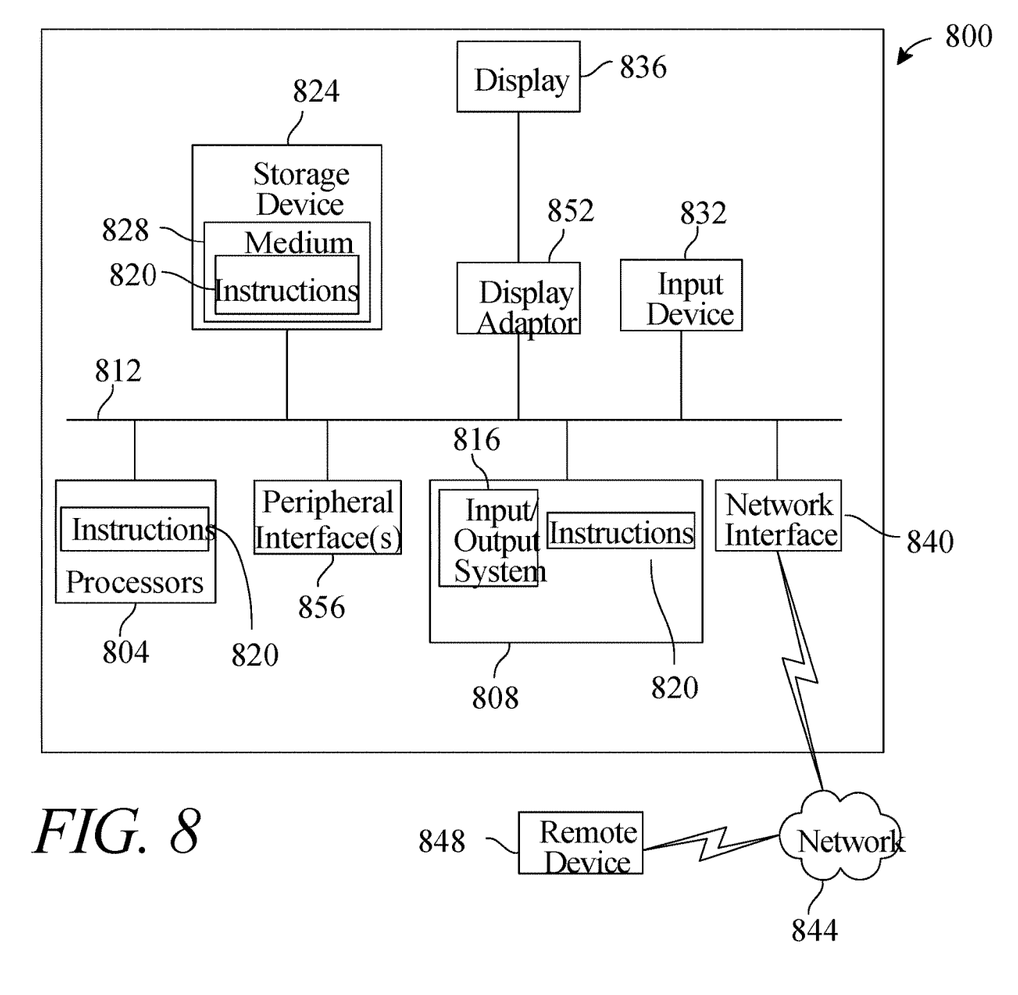
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A multi-processor mobile computing device, the device comprising:
    a first processor connected to a first operating memory, the first processor connected to a mobile display, wherein:
        the first processor is powered by a portable power source integrated into the multi-processor mobile computing device; and
        the first processor has at least a first memory cache;
    a second processor connected to a second operating memory, wherein:
        the second processor is connected to a display input-output port;
        the second processor is activated only when mobile device is connected to an external power source;
        the second processor has at least a second memory cache; and
    a dual-function operating system, the dual-function operating system including a mobile operating system module operating on the first processor, the mobile operating system module having a first capability set; and a desktop operating system module operating on the second processor, the desktop operating system module having a second capability set, wherein the second capability set differs from the first capability set; wherein the multi-processor computing device is configured to copy memory from the at least a second memory cache to the at least a first memory cache when the second processor is deactivated; wherein the first processor is configured to treat the second memory cache as an extended level cache when both the first processor and the second processor are active.

2. The device of claim 1, wherein the first processor is incorporated in a system on a chip.

3. The device of claim 1, wherein the portable power source further comprises a battery.

4. The device of claim 1, wherein the first processor is connected to a baseband processor coupled to a cellular radiofrequency transceiver.

5. The device of claim 1, wherein the second processor is incorporated in a single board computer.

6. The device of claim 1, wherein the display input-output port is connected to an auxiliary display.

7. The device of claim 6, wherein the second processor is configured to stream output to the auxiliary display.

8. The device of claim 1, wherein the display input-output port further include comprises a wireless port.

9. The device of claim 1, wherein the external power source further comprises a wired power source.

10. The device of claim 1, wherein the first capability set includes wireless call placement.

11. The device of claim 1, wherein the first capability set includes a restricted non-administrative access to the desktop operating system module.

12. The device of claim 1, wherein the second capability set includes a restricted non-administrative access to the mobile operating system module.

13. The device of claim 1, wherein the second capability set excludes call placement.

14. The device of claim 1, wherein the desktop operating system module automatically activates when the device is connected to the external power source.

15. The device of claim 1, wherein the second processor automatically activates when the multi-processor mobile computing device is connected to the external power source.

16. The device of claim 1, wherein the desktop operating system module operates as a thin-client module in connection with at least a remote device.

17. The device of claim 1, wherein the desktop operating system module is configured to use the mobile display as a secondary display.

18. The device of claim 1, wherein the desktop operating system module is configured to use the mobile display as a locator device in a display connected to display input-output port.

19. The device of claim 1, wherein the first processor is configured to remain active while the desktop operating system module is operating.

20. The device of claim 1, further comprising a charging dock, the charging dock configured to simultaneously charge and cool the device.

* * * * *